May 19, 1925.
J. E. ERDEY ET AL
1,538,478
LOCK FOR AUTOMOBILE STEERING WHEELS
Filed Aug. 29, 1922        2 Sheets-Sheet 2
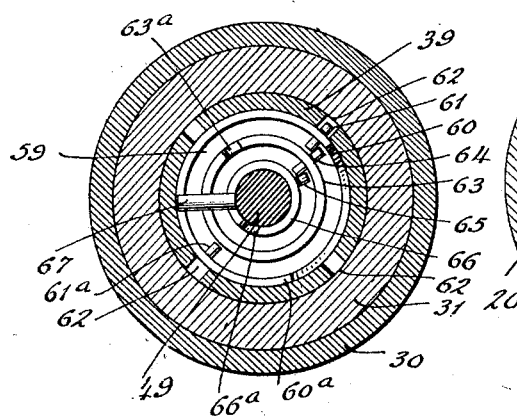
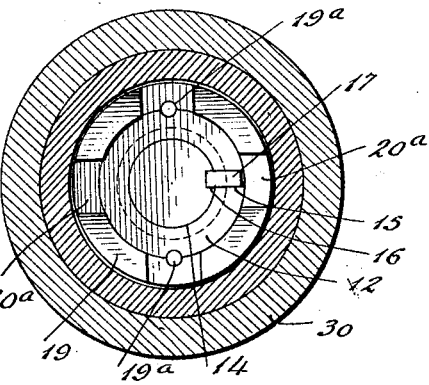
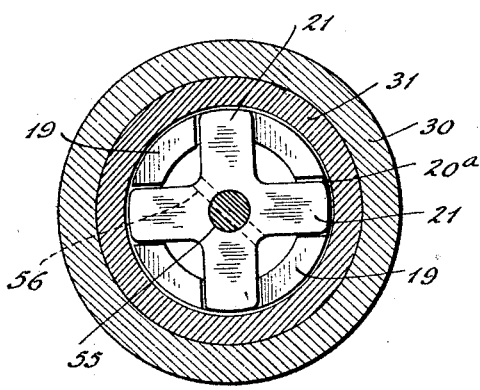
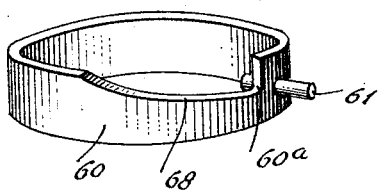
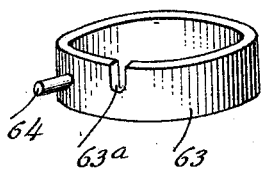
INVENTOR
JOSEPH E. ERDEY
HARRY E. KERR
BY
Richards Geier
ATTORNEYS Patented May 19, 1925.

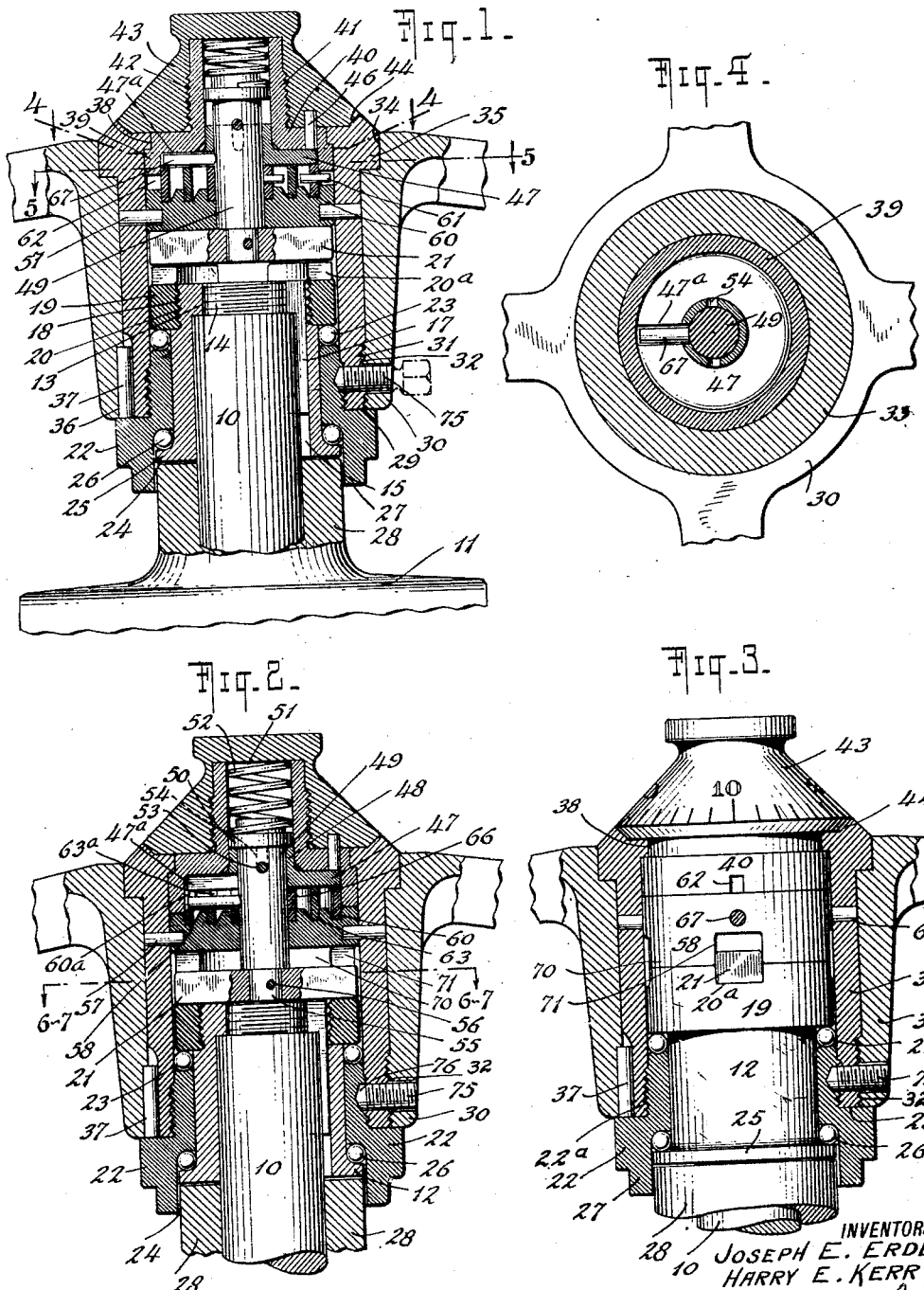

1,538,478

UNITED STATES PATENT OFFICE.

JOSEPH E. ERDEY AND HARRY E. KERR, OF CLEVELAND, OHIO, ASSIGNORS TO THE SAFELOCK CO. INC., OF CLEVELAND, OHIO, A CORPORATION OF DELAWARE.

LOCK FOR AUTOMOBILE STEERING WHEELS.

Application filed August 29, 1922. Serial No. 584,936.

*To all whom it may concern:*

Be it known that I, JOSEPH E. ERDEY, a citizen of the Republic of Hungary, residing at Cleveland, county of Cuyahoga, and State of Ohio, and I, HARRY E. KERR, a citizen of the United States, residing at Cleveland, county of Cuyahoga, and State of Ohio, have invented certain new and useful Improvements in Locks for Automobile Steering Wheels, of which the following is a specification.

The principal object of this invention is to provide a new and improved locking mechanism for the steering wheels of automobiles by means of which the wheel may be either locked to the steering column in an operative position or unlocked therefrom in such a condition that the turning of the steering wheel will be ineffective to operate the steering mechanism of a vehicle.

A further object is to provide a combination or permutation lock by means of which the operative condition of the steering wheel is controlled, thereby making it impossible for the wheel to be locked after it has been unlocked without knowing the proper combination for the lock.

Considered in its more specific aspects, an object of this invention is to improve upon the structure disclosed in the patent to Joseph Erdey, No. 1,499,356, issued July 1, 1924.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification:—

Fig. 1 is a central sectional view through an automobile steering wheel to which a lock embodying my invention has been attached and showing the wheel in the unlocked position.

Fig. 2 is a similar view showing the parts in the position in which the wheel is locked to the steering column.

Fig. 3 is a section along the same line as shown in Figs. 1 and 2, the sleeves enclosing the locking mechanism being shown in elevation.

Fig. 4 is a section on the line 4—4 of Fig. 1.

Fig. 5 is a section on the line 5—5 of Fig. 1.

Fig. 6 is a section on the line 6—7 of Fig. 2 showing the locking bar in plan or top view.

Fig. 7 is a section on the line 6—7 of Fig. 2 with the locking bar removed.

Fig. 8 is a perspective of the outer ring of the permutation lock and

Fig. 9 is a perspective of one of the inner rings of the lock.

In the drawings is shown an embodiment of our invention as applied to a Ford automobile, the numeral 10 indicating the steering shaft and the numeral 11 the gear case cover common to this type of machine. Secured to the shaft 10 is a bushing 12 having its central bore reduced and threaded as at 13 to receive the reduced threaded end 14 of the shaft, the bushing 12 being provided with a keyway 15 alined with the cooperating keyway 16 in the shaft 10 and in which keyways the key 17 is inserted to lock the bushing to the shaft after the bushing has been threaded onto the reduced threaded end 14 of the shaft. The outer circumference of the bushing is provided at its upper extremity with a reduced threaded end 18 upon which is screwed a lock base 19, the lower portion of the bore of which is threaded as at 20 to engage the threaded end 18 and the upper end of which projects upwardly beyond the bushing 12 and is provided with a plurality of slots 20ª preferably four in number which are equally spaced about the circumference of the lock base and are adapted to receive a plunger lock 21 to be hereinafter described. After the lock base has been screwed in place upon the bushing a pair of holes are drilled into the contacting surfaces of the lock base and bushing to receive the pins 19ª (see Fig. 7) to prevent relative rotation between these members.

A lock base cap 22 is rotatably mounted on and encases the lower end of the bushing 12, the upper face of the lock base cap and the lower face of the lock base defining a ball race in which the anti-friction balls 23 are enclosed. The power portion of the lock base cap is counterbored as at 24, a second ball race being defined between the base of the counter-bore and a flange 25 integral with the bushing 12 to receive the balls 26. The lower counter-bored portion 24 of the lock base cap is extended downwardly as at 27 to project over the upper boss 28 of the gear case cover so as to prevent the possibility of a thin tool being inserted between the lower end of the lock structure and the gear case to wedge the parts together. The upper portion of the outer circumference of the lock base cap 22 is reduced to provide a flanged shoulder 29 against which is seated the wheel hub 30 and the lock housing 31, the reduced end of the lock base cap and the lower inner bore of the lock housing being provided with the cooperating screw threads 32, the upper reduced portion of the lock base cap 22 being screw threaded as at 22ª to engage the cooperating screw threads of the lock housing 31.

The wheel hub 30 and the lock housing 31 are secured together by means of the cooperating screw threads 32 to prevent relative longitudinal movement between these members, and the wheel hub is counterbored at its upper end as at 34 to receive the upper flanged portion 35 of the lock housing. After the lock housing is screwed home into the wheel hub to seat the flanged portion 35 into the counterbore, a small hole is drilled into the parts as indicated at 36 to receive the locking pin 37 and thereby prevent relative rotary movement between the parts.

The upper inner bore of the lock housing is provided with a flanged shoulder 38 against which is seated the projecting flange 39 of the dial base 40 which is rotatably mounted within the lock housing and is provided with the upwardly projecting reduced threaded end 41 adapted to engage the threaded bore 42 of the dial 43, the dial 43 being rotatably seated within the recess 44 formed in the upper face of the lock housing. After the dial 43 has been screwed home sufficiently to just permit the dial and dial base to rotate with respect to the lock housing upon the dial base, a small hole is drilled into the dial and dial base as to receive the locking pin 46.

Seated within the lower counterbored portion of the dial base 40 is a ring flange 47 having an upwardly projecting hollow boss 48 in which is slidably received a plunger 49 in the form of a short solid shaft having an outwardly projecting shoulder or flange 50 adjacent its upper end between which and the base 51 of the bore 42 of dial 43 is mounted the coiled spring 52 adapted to normally urge the plunger to its lower position. A locking pin 53 is fixedly secured to extend diametrically through the plunger and its ends project outwardly beyond the plunger to engage within the elongated slots 54 provided in the upper face of the hollow boss 48 of the ring flange 47, thereby locking the ring flange and plunger against relative rotary movement.

The lower end of plunger 49 is reduced as at 55 and has secured thereto as by the pin 56, a plunger lock 21. The plunger lock is preferably formed with four equally spaced arms extending radially from the plunger and adapted to engage within the slots or recesses 20ª. It will be understood, however, that the number or shape of the arms and slots may be varied as desired.

Secured within the bore of the lock housing above the plunger lock as by the pins 57 is a ring retaining member 58 having a plurality of spaced concentric grooves 59 in its upper face, there being three of such grooves shown in the drawing, but it will be understood that any number may be resorted to. Rotatably mounted within the grooves 59 are a number of rings, one for each groove, the outer ring 60 having secured therein a pin 61, the outer end of which extends into one of a plurality of recesses 62 formed in the lower face of the flanged end 39 of the dial base 40. The inner end of pin 61 and a pin 61ª also secured in the outer ring 60 extend across the space between the outer ring 60 and the intermediate ring 63 and are adapted to engage the outer end of a similar pin 64 (Fig. 5) secured in the intermediate ring 63. The pin 64 in turn is adapted to engage a pin 65 projecting outwardly from the side of the inner ring 66 the inner diameter of the inner ring preferably being such as to provide a neat rotating fit over the plunger. The inner and intermediate rings are provided on their upper faces with the slots 66ª and 63ª respectively, in which is adapted to be engaged the pin 67 which is secured within and projects outwardly from the plunger, and passes across the radial slot 47ª of the ring flange 47.

The upper face of the outer ring 60 is provided with a cut out portion 60ª (see Fig. 8) into which the pin 67 is adapted to seat and the cut out portion is formed with a curved cam surface 68 adapted to contact with the pin 67 and raise it out of the slots 63ª and 66ª when the dial 40 is rotated in a clockwise direction.

The ring retainer 58 has an annular flange 70 extending downwardly from its lower face which flange is in alignment with the upwardly extending portion 19 of the lock base and of similar cross sectional configuration, and is provided with a plurality of slots or recesses 71 similar to the recesses 20ª to receive the plunger lock 21. The depth of the slots 71 are just sufficient to permit the lower face of the plunger lock 21 to clear the upper face of the lock base 19 when in its upper position as shown in Fig. 1, and the slots 20ª are preferably equal one half the thickness of the plunger lock so that it will engage both the slots 20ª and 71 when in the lower position shown in Fig. 2.

The manner of assembling the lock structure is as follows. The dial base 40 is placed within the lock housing 31 with its upper face in engagement with the shoulder 38 after which the dial 43 is screwed upon the reduced threaded end 41 sufficiently to allow a rotating fit between the dial and dial base without any longitudinal play or lost motion. A hole is then drilled for pin 46 which is driven home to lock the dial and dial base against relative rotation. The ring flange 47 is now placed upon plunger 49 with slots 47ª in engagement with pin 53, pin 67 is then driven into plunger thus preventing the ring flange from dropping off and the ring retainer 58 with rings 60, 63 and 66 thereon is placed over the plunger, the slots 63ª 66ª and cut out portion 60ª being placed over the pin 67. Plunger lock 21 is then placed over the reduced end 55 of plunger 49 and pin 56 is driven home. The spring 52 is placed over the upper end of the plunger and the plunger with its associated parts is inserted into the lock housing, the upper end of plunger and spring 52 passing through the bore of the dial base with the spring 52 making contact with the base 51 of the bore 42 of the dial 43. Holes are now drilled in the sides of the ring retainer for the pins 57, it being understood that the holes in the lock housing for pins 57 will be drilled at the proper points before assembly. The pins 57 are then driven home, thus locking the ring retainer and lock housing against relative rotation and maintaining the dial and the operative members of the permutation lock in a compact unitary structure. It will be understood that the relative positions of the pins 61, 64, and 65 and slots 63ª, 66ª, and cut out portion 60ª will determine the combination for each particular lock and that these positions will be varied as desired. After the plunger and its associated parts have been secured within the lock housing the wheel hub 30 is screwed onto the lock housing by cooperating screw threads 32 after which hole 36 is drilled and pin 37 driven home to lock the wheel hub and lock housing against relative rotation. The elements above described constitute the upper assembled unit or part of the lock, the lower unit or base comprising the bushing 12 and lock base cap 22 which are retained together by the lock base 19. In placing the lock upon the car the usual wheel is removed, also the usual gear case cover and the gear case cover shown in the drawings is substituted. The key 17 is removed from the shaft and the lower unit or base comprising the parts 12, 19 and 22 is screwed upon the shaft until firmly seated, the key ways 15 and 16 being brought into alignment and the pin 17 is driven home. The upper assembly is now placed over the lower unit and screwed over the screw threads 22ª until the base of the housing and hub are firmly seated against shoulder 29. The set screw 75 is now screwed into one of a number of screw centers 76 which are placed at suitably spaced points about the reduced portion of the lock base cap 19, it being understood that the parts will be adjusted to bring the screw center in alignment with the set screw hole. After the set screw is driven home its head is broken off to prevent the wheel from being detached. The operation of the lock is as follows. Assuming the parts to be in the position shown in Fig. 1 in which position the dial has been rotated to cause the cam portion 68 to raise the pin 67 and force the plunger 49 upwardly against the action of spring 52, and to raise the plunger lock 21 out of the slots 20ª, it will be obvious that with the parts in this position rotation of the wheel will not influence the shaft 10, as the rotation of the wheel will merely turn the lock housing 30 and with it all the members of the upper assembly and also the lock base cap 22, but will not actuate the lock base 19 or bushing 12, the presence of the anti-friction balls ensuring the free relative rotation of the upper assembly without carrying along the members connected to the steering shaft. If it is desired to lock the wheel the operator rotates the dial according to the given combination. It will be obvious that the rotation of the dial will turn the dial base because of locking pin 46 and that rotation of the dial base will turn the rings 60, 63, 66 by recess 62, and pins 61, 64 and 65. The purpose of the pin 61ª in the outer ring will now be set forth, assuming that the given combination for the lock for example is 5–37–29, and that the dial has been rotated in a clockwise direction to bring the pins 61, 64 and 65 in engagement as shown in Fig. 5 of the drawings the rotation of the dial is continued to bring the graduation 5 in registry thus setting the inner ring with its recess 66ª in alignment with pin 67. The intermediate ring 63 is next set by reversing the rotation of the dial. If the pin 61ª is omitted it will be obvious that a complete rotation of the dial would be necessary before pin 61 would again contact with pin 63 which would not only be confusing but would also require additional time in the setting of the lock which would be objectionable; therefore by inserting the extra pin 61ª preferably diametrically opposite pin 61, the rotation of the dial will be operative to actuate the intermediate ring as soon as a half reverse revolution of the dial is completed. The graduation 37 of the dial is then brought into registry thus setting the intermediate ring with its recess 63ᵃ in alignment with the pin 67. The dial is then again rotated in the clockwise direction until the graduation 29 is brought into registry thus bringing the recessed or cut out portion 60ᵃ into alignment with the pin 67. When the combination has been set to bring the slots 63ᵃ and 66ᵃ and cut out portion 60ᵃ into alignment with pin 67, spring 52 will cause plunger 49 to descend, moving plunger lock 21 into recesses 20ᵃ and locking ring retainer 58 and lock base 19 together, the parts now being in the position shown in Fig. 2. It will thus be evident that rotation of the lock housing 31, which in turn will rotate ring retainer by pins 67 and that rotation of the ring retainer will be communicated to the lock base 19 and through pins 19ᵃ communicated to bushing 12, which will rotate the steering wheel by means of key 17.

While we have shown the lower position of the plunger 21 as the locking position, it will be apparent that the parts could be constructed to make the upper position the locking position.

Attention is particularly called to the construction of the lock base cap with its depending flange 27, which effectually prevents the insertion of any thin tool between the wheel and any of the parts connected to the steering shaft by frictional contact.

While we have shown our invention as applied to a Ford automobile it will be evident that the invention disclosed herein is applicable to any type of an automobile provided with a solid steering shaft.

Having thus described our invention, what we claim as new and desire to secure by Letters Patent, is:

1. A lock for automobile steering wheels comprising a base assembly consisting of a bushing adapted to be secured to the steering shaft of an automobile, a lock base secured to said bushing and a lock base cap; an upper assembly rotatably mounted on said lower assembly and including a steering wheel, a lock housing, means movable longitudinally of said shaft adapted to prevent relative rotation between said upper and lower assemblies, and lock mechanism to control the longitudinal movement of said means, said bushing lock base and lock base cap defining a plurality of ball races.

2. A lock for automobile steering wheels comprising a base assembly consisting of a bushing adapted to be secured to the steering shaft of an automobile, a lock base secured to said bushing and a lock base cap rotatably mounted on said bushing; and an upper assembly including a steering wheel, means to secure said steering wheel to said lock base cap, a locking member movable longitudinally of said shaft adapted to prevent relative rotation between said upper and lower assemblies and lock mechanism to control the longitudinal movement of said locking member.

3. A lock for automobile steering wheels comprising a base assembly consisting of a bushing adapted to be secured to the steering shaft of an automobile, a lock base secured to said bushing and a lock base cap rotatably mounted on said bushing, an upper assembly secured to said lock base cap, means adapted to be moved into cooperative engagement with said assemblies to prevent relative rotation therebetween and lock mechanism to control the movement of said means, said lock base cap being provided with a counterbore adapted to extend over and encase a portion of the steering gear cover to prevent the insertion of a thin tool or wedge between the parts.

4. A lock for automobile steering wheels comprising a base assembly, including a member adapted to be secured to the steering shaft of an automobile, a lock base secured to said member, a lock base cap rotatably mounted on said member, an upper assembly comprising a steering wheel, a lock housing, means to secure said steering wheel, lock housing and lock base cap together, a permutation lock enclosed in said lock housing, a dial rotatably mounted on said housing, means to prevent longitudinal movement of said dial connection said dial and permutation lock and a locking member controlled by said permutation lock adapted to be moved longitudinally of said shaft to prevent relative rotation between said upper and lower assemblies.

5. A lock for automobile steering wheels comprising a base assembly including a member adapted to be secured to the steering shaft of an automobile, a lock base secured to said member, a lock base cap rotatably mounted on said member, an upper assembly comprising a steering wheel, a lock housing, means to secure said steering wheel, lock housing and lock base cap together, a permutation lock enclosed in said lock housing, a dial cap rotatably mounted within said lock housing, a dial secured to said dial cap against relative longitudinal and rotary movement with respect thereto, a permutation lock enclosed within said housing, means connecting said dial cap and permutation lock and locking member controlled by said permutation lock mounted for longitudinal movement within said housing adapted to be moved into engagement with and to prevent relative rotary motion between said upper and lower assemblies.

6. A lock for automobile steering wheels comprising a base assembly including a member adapted to be secured to the steering shaft of an automobile, a lock base secured to said member, a lock base cap rotatably mounted on said member, an upper assembly comprising a steering wheel, a lock housing means to secure said steering wheel, lock housing and lock base cap together, a permutation lock enclosed in said lock housing, said housing provided at its upper end with an inwardly projecting shoulder, a dial cap rotatably mounted within said housing in contact with the lower face of said shoulder, a dial mounted upon said housing in contact with the upper face of said shoulder, means to secure said dial and dial cap together against longitudinal movement whereby said shoulder will prevent removal of said dial, means to prevent relative rotation between said dial and dial cap, a permutation lock enclosed within said housing, means connecting said dial cap and permutation lock and a locking member controlled by said permutation lock mounted for longitudinal movement within said housing adapted to be moved into engagement with and to prevent relative rotary motion between said upper and lower assemblies.

7. A lock for automobile steering wheels comprising a base assembly, including a member adapted to be secured to the steering shaft of an automobile, a lock base secured to said member, a lock base cap rotatably mounted on said member, an upper assembly comprising a steering wheel, a lock housing means to secure said steering wheel, lock housing and lock base cap together, a permutation lock enclosed in said lock housing, said housing provided at its upper end with an inwardly projecting shoulder, a dial cap rotatably mounted within said housing in contact with the lower face of said shoulder, a dial mounted upon said housing in contact with the upper face of said shoulder, means to secure said dial and dial cap together against longitudinal movement whereby said shoulder will prevent removal of said dial, means to prevent relative rotation between said dial and dial cap, a plunger mounted within said dial cap, means to prevent relative rotation between said plunger and dial cap but permitting longitudinal movement of said plunger within said dial cap, said dial cap provided with a radially extending recess, a pin projecting radially of said plunger within said recess, a ring retainer enclosed within and secured to said housing, a plurality of rings rotatably mounted upon said ring retainer, each of said rings provided with a slot adapted to receive said pin, resilient means coacting with said plunger to normally force said pin into said slots, and a locking member carried by said plunger adapted when said pin is engaged with said slots to lock said lock base and ring retainer against relative rotation with respect to one another.

In testimony whereof we have affixed our signatures.

JOSEPH E. ERDEY.
HARRY E. KERR.